United States Patent [19]

Newquist et al.

[11] Patent Number: 4,895,378
[45] Date of Patent: Jan. 23, 1990

[54] SLIDABLE HIGH-TEMPERATURE SEAL

[75] Inventors: Charles W. Newquist, Seattle; Willard N. Westre, Bellevue; Robert A. Burns, Seattle; Harry W. Dursch, Seattle, all of Wash.

[73] Assignee: The Boeing Company, Seattle, Wash.

[21] Appl. No.: 207,337

[22] Filed: Jun. 15, 1988

[51] Int. Cl.4 .................. F16J 15/00; F16J 15/34; B64B 1/36; B64C 15/00
[52] U.S. Cl. .................. 277/12; 277/206 R; 244/52; 403/288
[58] Field of Search .................. 277/12, 205, 236, 30, 277/206 R; 244/52, 131; 403/288; 239/265.19, 265.33, 265.37, 265.43

[56] References Cited

U.S. PATENT DOCUMENTS

| | | | |
|---|---|---|---|
| 3,354,649 | 11/1967 | Madden | 277/3 |
| 3,892,358 | 7/1975 | Gisslen | 239/265.43 |
| 4,013,226 | 3/1977 | Willard | 239/265.37 |
| 4,110,972 | 9/1978 | Young et al. | 239/265.19 |
| 4,206,893 | 6/1980 | Howard | 239/265.31 |
| 4,212,472 | 7/1980 | Mizuno et al. | 277/12 |
| 4,221,390 | 9/1980 | Bainbridge | 277/12 |
| 4,575,006 | 3/1986 | Madden | 277/236 |
| 4,575,099 | 3/1986 | Nash | 277/12 |
| 4,783,085 | 11/1988 | Wicks et al. | 277/12 |

Primary Examiner—Allan N. Shoap
Assistant Examiner—Diego F. F. Gutierrez
Attorney, Agent, or Firm—Seed and Berry

[57] ABSTRACT

A seal for preventing extremely hot gases from passing between a movable engine ramp and an engine splitter wall in a hypersonic aircraft. The seal moves with the engine ramp, in a direction parallel to the surface of the splitter wall. The seal includes a first flange which makes sliding contact with the outer engine ramp surface and is attached to a flexible sealing portion that fills the gap between the ramp and wall. The sealing portion maintains sliding contact with the wall as the gap changes dimension due to variations in the ramp's temperature. The attachment region can be a concave surface to radiate the seal's heat. In a second embodiment, the seal includes a second flange through which the seal is attached to the cooler side of the engine ramp.

18 Claims, 5 Drawing Sheets

SLIDABLE HIGH-TEMPERATURE SEAL

GOVERNMENT RIGHTS

This invention was made with Government support under Contract No. F33657-86-C-0061 awarded by the U.S. Department of the Air Force. The Government has certain rights in this invention.

TECHNICAL FIELD

This invention relates to high-temperature seals and more particularly to seals to prevent leakage of high-temperature gases between a movable engine ramp and an engine splitter wall.

BACKGROUND ART

It is of great current interest to develop an aircraft with the ability to cruise at hypersonic velocities up to Mach 25. Aircraft which are capable of such flights pass through different flight regimes during a typical flight, including low, medium, and high Mach number velocities. Such aircraft are subjected to an extremely broad temperature range, from the extremely low temperatures associated with subsonic atmospheric flight to the extremely hot temperatures (e.g., 5000 degrees Fahrenheit) associated with hypersonic atmospheric flight. As a consequence, the aircraft must be designed to withstand such extreme temperatures and velocities.

The development of materials which are capable of operating in such environments has been underway for a considerable time. Carbon-carbon composites have been found to be particularly suitable for such applications, as they can undergo exposure to the temperature and pressure extremes expected with hypersonic aircraft without losing strength or otherwise degrading. However, such composites oxidize when exposed to oxygen, as will be found in the atmosphere. Oxidation effectively burns up structures made from carbon-carbon composites.

To combat the effects of oxidation on carbon-carbon composites, coatings, including silicon carbide (SiC) coatings, have been developed. Coatings of this type have been disclosed in U.S. patents issued to Patten, et al. (U.S. Pat. No. 4,500,602), Holzl (U.S. Pat. No. 4,515,860), Shuford (U.S. Pat. Nos. 4,471,023 and 4,465,777), Honjo et al. (U.S. Pat. No. 4,405,685), and Chandler et al. (U.S. Pat. No. 4,621,017). Carbon-carbon composite materials which have been coated with such compositions are very stiff, and attempts to increase their flexibility by reducing their thickness also reduces their strength.

Particular concern has been directed toward the various seals which must be used on hypersonic aircraft. Such seals include those for aerodynamic control surfaces, windows, landing gear doors and engine ramp/splitter walls (which duct air into the aircraft's engines). These seals must be designed to withstand the extreme temperatures and velocities while maintaining the requisite flexibility. They should also be capable of preventing the passage of high temperature gases and can, consequently, be more effective if they take the form of a single piece seal. The seal problem is particularly difficult for the engine ramp/splitter wall seals, since leakage of the hot atmospheric gases can severely affect the performance of the aircraft's engines and leakage of pressurizing gases from under the engine ramps is inefficient.

Many of the seal applications in a hypersonic aircraft must also allow for the two sealed surfaces to move with respect to one another, frequently against the direction of the high velocity atmosphere. Carbon fiber seals have long been proposed for use in regenerators for gas turbine engines, as disclosed in United States patents issued to Zeek et al. (U.S. Pat. No. 3,743,008), Siegla (U.S. Pat. No. 3,856,077), Rao (U.S. Pat. No. 3,913,926), Sakaki (U.S. Pat. No. 4,071,076), and French et al. (U.S. Pat. No. 4,183,539). However, the prior art does not show that such seals are intended to move with or against the direction of the flowing gases which they seal.

Attachment of the seal is another aspect of the problem. When the seal is operating in environments whose temperatures can reach 5000 degrees Fahrenheit, it can be very difficult to reliably attach the seal to one of the surfaces it is intended to seal. This is particularly the case when the seal is exposed to a high velocity atmosphere which can quickly oxidize most fasteners.

It is therefore desirable to have seals made from the stiff materials which can both withstand the high temperatures and pressures expected in the operation of a hypersonic aircraft and prevent the leakage of hot gases.

DISCLOSURE OF THE INVENTION

It is an object of the present invention to provide a one-piece seal which can prevent the leakage of hot gases.

It is another object of the present invention to provide a seal made from a high-temperature resistant material such as carbon-carbon composite.

It is yet another object of the present invention to provide a seal which can be attached to a surface in a high temperature environment without exposing the attachment to the environment.

It is a still further object of the present invention to provide a seal which can slide with respect to a surface that it is sealing while the surface is exposed to a high temperature environment.

In general, the invention is a one-piece seal for preventing leakage of hot gases through a gap from a first side of a barrier to a second side of the barrier. The gap exists between an edge surface joining the first and second barrier sides and a substantially flat surface parallel to the edge surface, and the barrier is movable in a direction that is parallel to the surfaces. The seal comprises a first flange adapted to make sliding contact with the first side of the barrier. It also comprises a flexible sealing portion attached to the first flange and adapted to fit in the gap and to make sliding contact with the flat surface outside of the gap and outwardly from both of the barrier sides. It further comprises means for attaching the seal to the barrier.

The seal can include first and second means for making sliding contact with the flat surface. Each of the first and second means comprises a ridge having a flat contact surface projecting toward the flat surface from the flexible sealing portion. The first means contacts the flat surface outwardly of the first barrier side, and the second means contacts the flat surface outwardly of the second barrier side.

In one embodiment, the flexible sealing portion is attached to the first flange and includes means for attaching the seal to the edge surface of the barrier.

In a second embodiment, the second flange is adapted to be attached to the second side of the barrier.

BEST MODES FOR CARRYING OUT THE INVENTION

Figure 1:
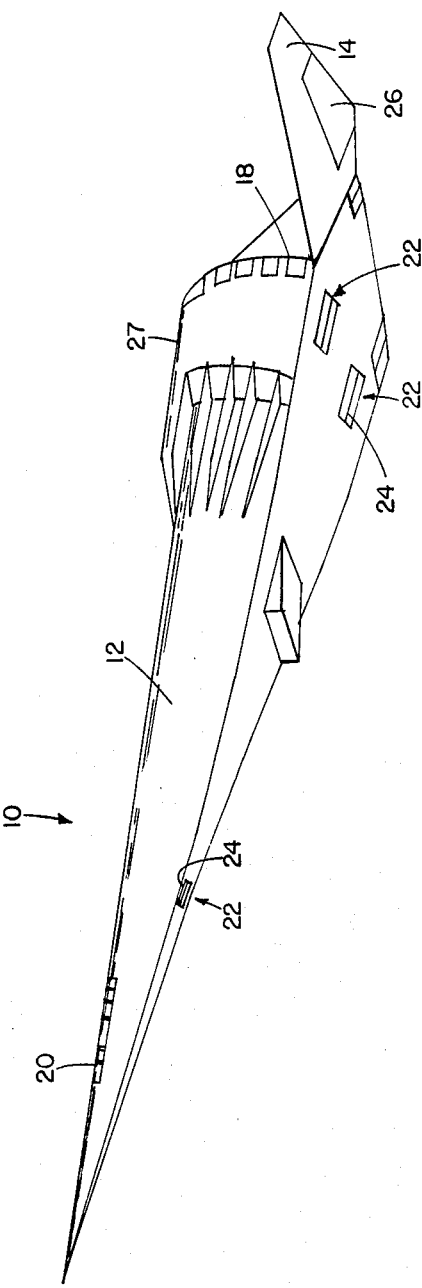
FIG. 1 is a schematic drawing of an aircraft designed to be capable of hypersonic flight, showing the location of the aircraft's engines and engine inlets.

FIG. 1 is a schematic drawing of a proposed hypersonic aircraft 10. This proposed aircraft is capable of taking off from the surface of the earth and flying, at hypersonic velocities, on a trajectory which carries it through the earth's atmosphere. The velocities can reach up to Mach 25.

The aircraft 10 comprises a fuselage 12, a set of wings 14, and several engines located near the aircraft's aft end 18. The fuselage 12 includes windows 20 and landing gear bays 22, which are sealed from the atmosphere by landing gear doors 24. The wings 14 include control surfaces 26. The windows 20, the landing gear doors 24, and the control surfaces 26 must all be sealed from the atmosphere through which the aircraft 10 is flying. The window seals must prevent leakage of the atmosphere into the fuselage 12, as must seals for the landing gear doors 24. The seals for the control surfaces 26 must prevent the atmosphere from passing from the high pressure sides of the wings 14 to their low pressure sides.

The boundary layer adjacent to the aircraft can range in temperature up to approximately 5000 degrees Fahrenheit. In addition, the atmosphere can impose pressures as great as 2000 pounds per square foot (psf). Ascent imposes the most severe thermal/mechanical loading on the aircraft. Based on a dynamic pressure of 2000 psf, boundary layer temperatures approaching 5000 degrees Fahrenheit are possible. High dynamic pressure at high Mach numbers are needed for efficient operation of the engines.

Figure 2:
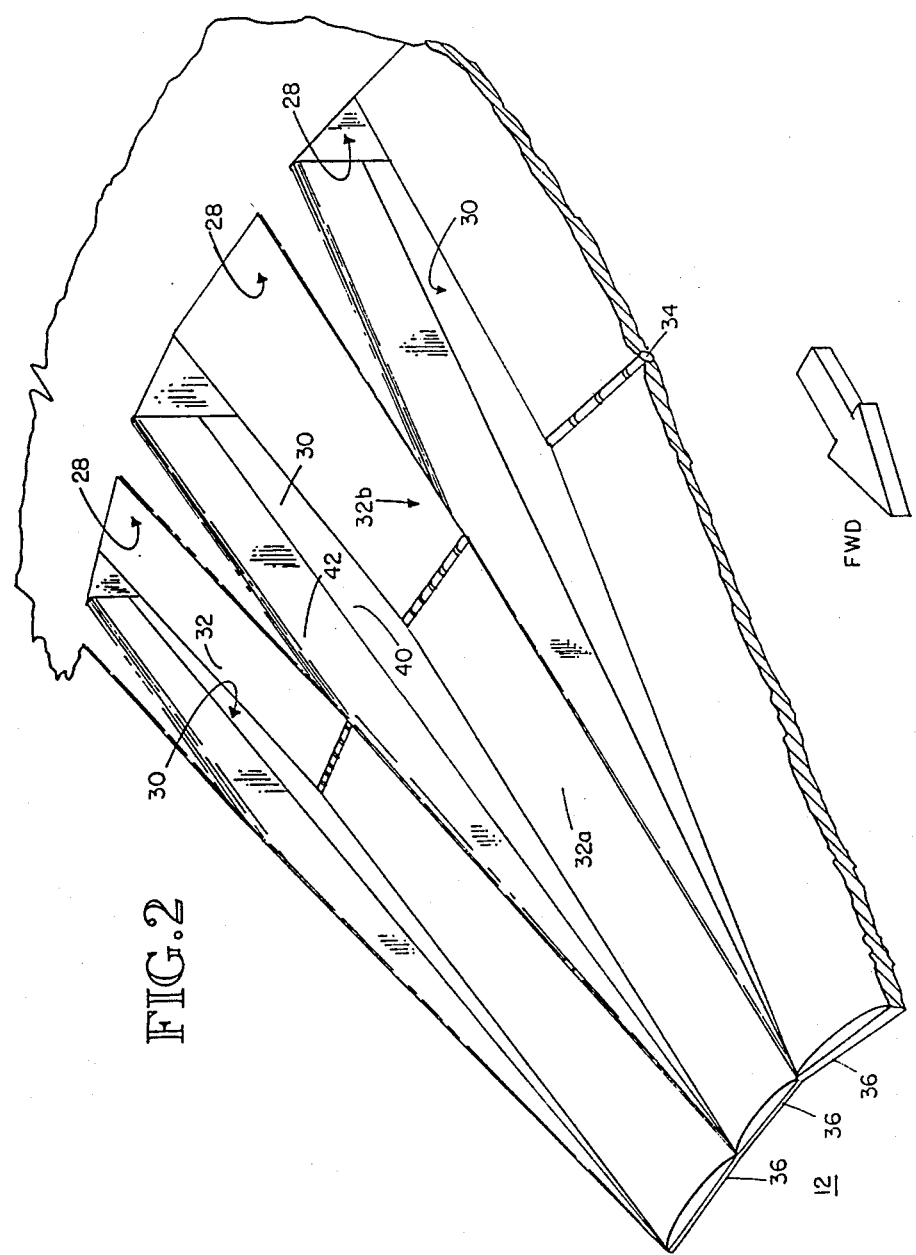
FIG. 2 is a close-up schematic drawing, in partial cross-section, of some of the engine inlets shown in FIG. 1.

The aircraft's engines can be configured in a forward-facing ring 27 located near the aft end 18. As shown in the close-up schematic drawing of FIG. 2, the ring 27 includes a number of engine inlets 28 which are displaced radially from the fuselage 12. Each inlet 28 is defined by transversely opposing sidewalls 30 and an engine inlet ramp, or barrier, 32. The inlet ramps 32 can be either a single flat piece of material, or made from two or more ramp segments 32a, 32b, etc. A single ramp 32 can be approximately 20 feet long, 40 inches wide, and 4 inches thick. If the ramp consists of ramp segments, there are hinges 34 between segments. The ramp 32, or ramp segments 32a, are hinged at their forward edges 36.

The ramps 32, or segments 32a, 32b, etc., are connected to independent actuators (not shown), which can bear against the underlying fuselage 12 (not shown) and cause the ramps to move radially. The underside of the inlet ramps 32 can be pressurized (for example, by pressurized helium). If desired, the space under the inlet ramps 32 can be divided into separate compartments (not shown), each of which can be individually pressurized. The pressurization is used to prevent the ramp from buckling, to assist the actuators, and to reduce the pressure on the seals to be described below. Since each compartment can be individually pressurized, the pressure between two adjacent compartments can be different. The pressure in a given compartment can be either greater or less than the pressure on the opposing side of the ramp 32, depending upon the aircraft's flight regime. Therefore, the seal is designed to seal in both directions.

Two or more engines (not shown) can be located aft of each inlet 28. Each engine can be intended to operate within a different velocity regime. For example, each inlet 28 can duct air to a transsonic engine, a supersonic engine, and a hypersonic engine, depending upon the position of the inlet ramp 32. In addition, when the inlet ramp 32 is segmented, the segments can be controlled to provide the air to the engines under optimized pressure conditions.

The splitter walls 30 separate the air flowing near the fuselage's outer surface into the individual inlets 28. Each wall 30 includes a relatively flat surface 40 (which is perpendicular to the outer surfaces of the ramp 32) and a contoured surface 42 which provides aerodynamically appropriate interconnections between the flat surfaces 40.

Figure 3A:
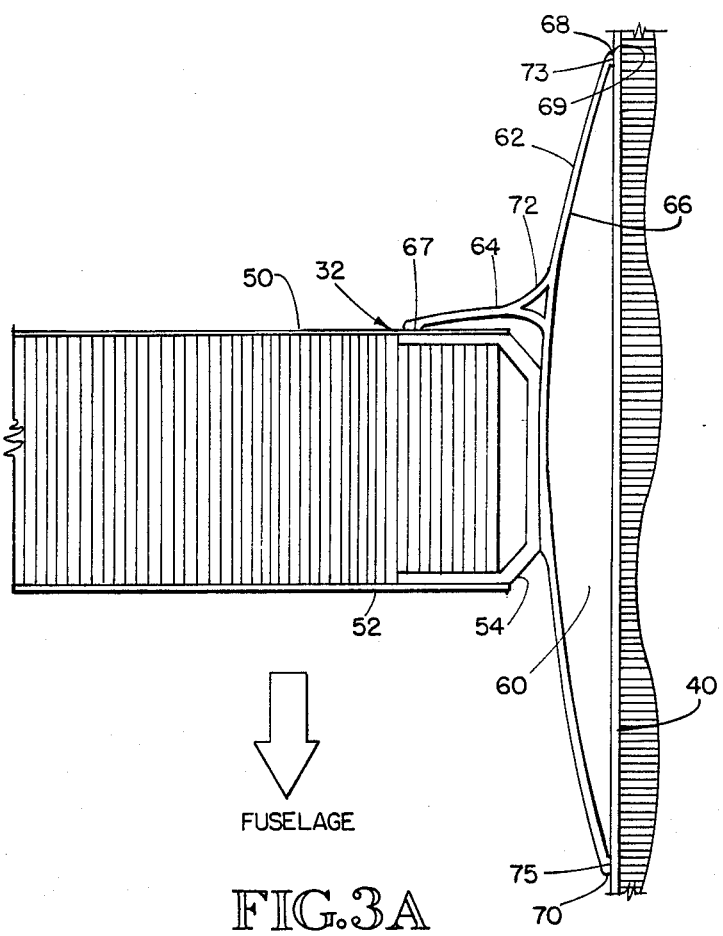
FIG. 3A is a close-up transverse cross-sectional view of the sealed engine ramp-engine splitter wall interface of the aircraft of FIG. 1, showing a first embodiment of the inventive seal in a cooled condition.
Figure 3B:
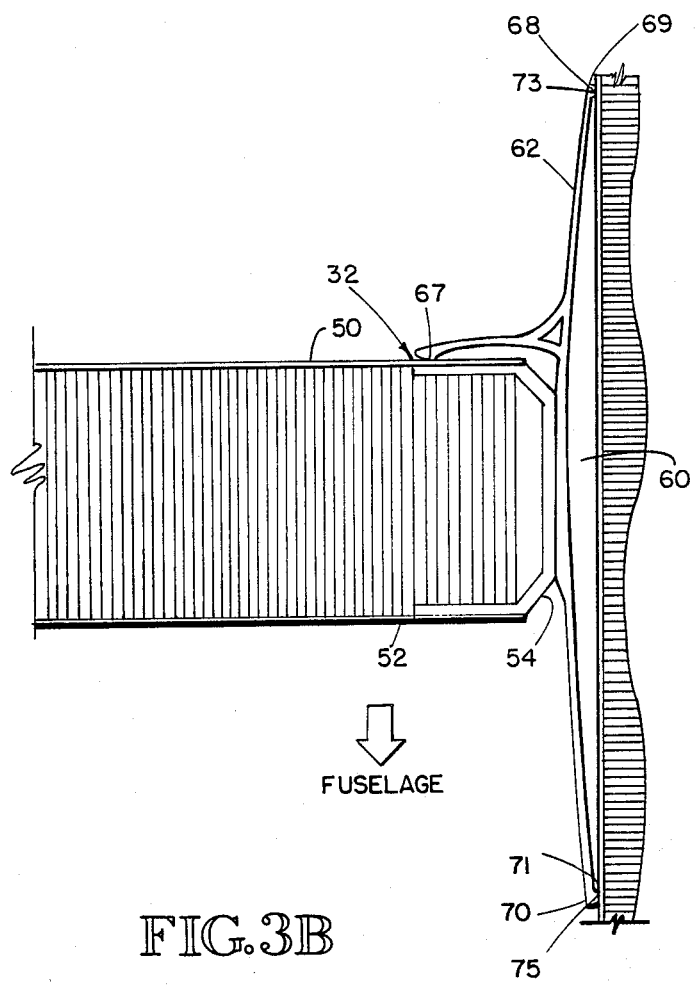
FIG. 3B is a close-up transverse cross-sectional view of the sealed engine ramp-engine splitter wall interface of the aircraft of FIG. 1, showing the first embodiment of the inventive seal in a heated condition.
Figure 4:
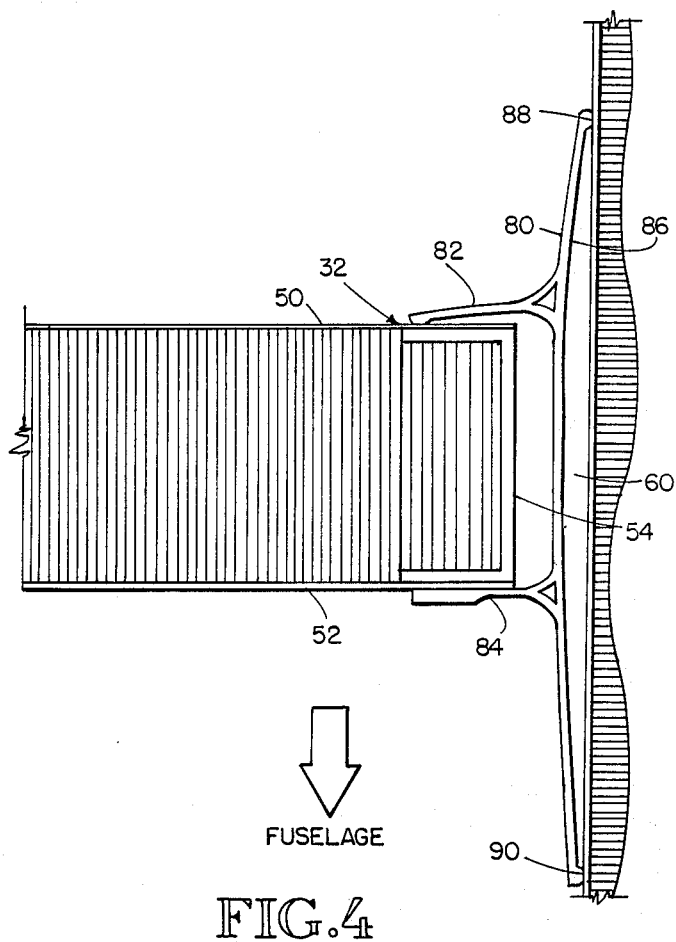
FIG. 4 is a close-up transverse cross-sectional view of the sealed engine ramp-engine splitter wall interface of the aircraft of FIG. 1, showing a second embodiment of the inventive seal in a heated condition.

The fit between the ramps 32 and the splitter walls 30 is shown in greater detail in the close-up transverse cross-sectional views of FIGS. 3A, 3B, and 4. The ramp 32 includes two surfaces. One is a first outer surface 50 which is exposed to the high-temperature atmosphere. The other is a second, inner surface 52 which faces the underlying fuselage 12 and against which the above-mentioned actuators can operate. Connecting the first and second surfaces 50 and 52 is an edge surface 54. The ramp 32 can be made from an appropriate superalloy or intermetalics, such as Incoloy 909 (or Inconel 718) honeycomb material which has been brazed to a face sheet made from the same material. The first surface 50 can be made from 0.075 inch thick Incoloy 909, which has been machined to provide 0.025 inch by 0.006 inch cooling passages through which a suitable coolant, such as gaseous hydrogen, passes. The material from which the ramp is made should be compatible with the coolant used. With cooling, the inlet ramp should reach a maximum temperature between approximately 1200 and 1800 degrees Fahrenheit, depending upon the material used. The edge surface 54 can be made from 0.2 inch thick Incoloy 909, which has been appropriately shaped.

A gap 60 exists between the edge surface 54 and the splitter wall surface 40. The size of the gap 60 depends upon the temperature of the inlet ramp 32, and is a function of the coefficient of thermal expansion of the material from which the ramp is made. Depending upon the temperature of the atmosphere near the ramp 32 and the effect of the cooling jackets formed in the surface 50, the gap 60 can vary between 0.45 and 0.85 inch if the ramp 32 is made from Inconel 718.

One embodiment of the seal 62 is shown in FIGS. 3A and 3B. It can be made from a carbon-carbon composite substrate, such as a two-dimensional laminate, angle interlock, or other multi-dimensionally reinforced material that is approximately 0.058 inch thick. This material can be coated with a silicon carbide coating approximately 0.015 inch thick.

The seal 62, which includes a first flange 64 and a flexible sealing portion 66, fits within the gap 60. The first flange makes sliding contact with the first surface 50 at point 67 through a suitable contact surface. The seal is particularly effective, and its coating durable, if the projection surface contacting the first surface is flat. The flexible sealing portion 66, which extends approximately 6.5 inches from a position outward of first ramp surface 50 (point 68) to a position outward of second ramp surface 52 (point 70), makes sliding contact with the splitter wall surface 40 at points 68 and 70. The sliding contact is maintained by ridges 69 and 71 which respectively have flat contact surfaces 73 and 75 and project from the flexible sealing portion 66. In addition, the flexible sealing portion 66 includes means for attaching the seal 62 to the edge surface 54 of the ramp 32. The attachment means can be any suitable means, such as holes formed in the flexible sealing portion 66. By being fastened to the cooled inlet ramp 32, any fasteners used will not be subjected to the extreme temperatures to which the first surface 50 is exposed.

The extended length of the flexible sealing portion 66 allows the seal 62 to undergo significant deformation without developing the tendency to deteriorate its SiC coating. This allows the seal to accommodate both for thermally-induced changes in width of the ramp 32 and flexing ("oilcanning") of the flat surface 40. Examples of this capability are illustrated in FIGS. 3A and 3B, which respectively illustrate the geometry of the seal 62 under low and high temperature conditions.

The juncture 72, where the first flange 64 is attached to the flexible sealing portion 66, is preferably formed in a concave surface directed outwardly from the first surface 50 and the wall surface 40. In this configuration, the seal 62 is less susceptible to heating due to a stagnation zone which would otherwise form. The juncture 72 can also radiate its heat to the atmosphere more efficiently if its surface has a relatively large radius.

FIG. 4 is a close-up transverse cross-sectional view of the sealed inlet ramp-engine splitter wall interface of the aircraft of FIG. 1, showing a second embodiment of the inventive seal in a heated condition. In this embodiment the seal 80 includes a first flange 82, a second flange 84, and a flexible sealing portion 86. As described above in connection with FIGS. 3A and 3B, the flexible sealing portion 86 contacts the wall surface 40 at points 88 and 90, which are approximately 6.5 inches apart. The first flange 82 makes sliding contact with the first surface 50, as the width of the ramp 32 varies with changing temperature. The second flange 84 is attached to the second surface 52 through high-temperature fasteners or other means known to those skilled in the art. By being fastened to the cooled inlet ramp 32, the fasteners will not be subjected to the extreme temperatures to which the first surface 50 is exposed.

While the foregoing descriptions have been directed toward preferred embodiments of the invention, one skilled in the art will readily appreciate that various modifications of the above-described embodiments may be made without departing from the spirit and the scope of the invention. In particular, the above-described embodiments can be used in other applications beside that of sealing an inlet ramp/splitter wall interface. Accordingly, the spirit and the scope of the present invention are to be limited only by the following claims.

We claim:

1. A one-piece seal for preventing leakage of hot gases from a first side of a barrier to a second side of said barrier through a gap between an edge surface joining said first and second barrier sides and a substantially flat surface parallel to said edge surface, said barrier being movable in a direction that is parallel to said surfaces, the seal comprising:
   first flange means for making sliding contact with said first side of said barrier:
   a flexible sealing portion attached to said first flange means, said flexible sealing portion fitting in said gap and making sliding contact with said flat surface outside of said gap and outwardly from both of said barrier sides; and
   means for attaching said seal to said barrier.

2. The seal of claim 1 wherein said attachment of said sealing portion to said first flange means includes a rounded concave surface directed away from said first side and said flat surface.

3. The seal of claim 1 wherein said first flange means includes means for making sliding contact with said first side of said barrier, said sliding contact means comprising a ridge having a flat contact surface projecting toward said first side from said first flange.

4. The seal of claim 1 wherein said flexible sealing portion includes first and second means for making sliding contact with said flat surface, each of said first and second means comprising a ridge having a flat contact surface projecting toward said flat surface from said flexible sealing portion, said first means contacting said flat surface outwardly of said first barrier side, and said second means contacting said flat surface outwardly of said second barrier side.

5. The seal of claim 1 wherein said means for attaching said seal to said barrier includes fasteners.

6. The seal of claim 1 wherein said seal is made from a carbon-carbon composite material 7. A one-piece seal for preventing leakage of hot gases from a first side of a barrier to a second side of said barrier through a gap between an edge surface joining said first and second barrier sides and a substantially flat surface parallel to said edge surface, said barrier being movable in a direction that is parallel to said surfaces, the seal comprising:
   first flange means for making sliding contact with said first side of said barrier;
   a flexible sealing portion attached to said first flange means, said flexible sealing portion fitting and making in said gap and making sliding contact with said flat surface outside of said gap and outwardly from both of said barrier sides, said sealing portion including means for attaching said seal to said edge surface of said barrier.

8. The seal of claim 7 wherein said attachment of said sealing portion to said first flange means includes a rounded concave surface directed away from said first side and said flat surface.

9. The seal of claim 7 wherein said first flange means includes means for making sliding contact with said first side of said barrier, said sliding contact means comprising a ridge having a flat contact surface projecting toward said first side from said first flange.

10. The seal of claim 7 wherein said flexible sealing portion includes first and second means for making sliding contact with said flat surface, each of said first and second means comprising a ridge having a flat contact surface projecting toward said flat surface from said flexible sealing portion, said first means contacting said flat surface outwardly of said first barrier side, and said second means contacting said flat surface outwardly of said second barrier side.

11. The seal of claim 7 wherein said means for attaching said seal to said barrier includes fasteners.

12. The seal of claim 7 wherein said seal is made from a carbon-carbon composite material.

13. A one-piece seal for preventing leakage of hot gases from a first side of a barrier to a second side of said barrier through a gap between an edge surface joining said first and second barrier sides and a substantially flat surface parallel to said edge surface, said barrier being movable in a direction that is parallel to said surfaces, the seal comprising:
   first flange means for making sliding contact with said first side of said barrier;
   second flange means attached to said second side of said barrier; and
   a flexible sealing portion attached to said first and second flange means, said flexible sealing portion fitting in said gap and making sliding contact with said flat surface outside of said gap.

14. The seal of claim 13 wherein said attachment of said sealing portion to said first flange means includes a rounded concave surface directed away from said first side and said flat surface.

15. The seal of claim 13 wherein said first flange means includes means for making sliding contact with said first side of said barrier, said sliding contact means comprising a ridge having a flat contact surface projecting toward said first side from said first flange.

16. The seal of claim 13 wherein said flexible sealing portion includes first and second means for making sliding contact with said flat surface, each of said first and second means comprising a ridge having a flat contact surface projecting toward said flat surface from said flexible sealing portion, said first means contacting said flat surface outwardly of said first barrier side, and said second means contacting said flat surface outwardly of said second barrier side.

17. The seal of claim 13 wherein said second flange means can be attached to said barrier by means of fasteners.

18. The seal of claim 13 wherein said seal is made from a carbon-carbon composite material.

* * * * *